United States Patent

[11] 3,560,744

| [72] | Inventor | Pierre Jordan<br>Zurich, Switzerland |
|---|---|---|
| [21] | Appl. No. | 871,725 |
| [22] | Filed | June 9, 1969 |
| [45] | Patented | Feb. 2, 1971 |
| [73] | Assignee | Picker Corporation<br>White Plains, N.Y.<br>a corporation of New York |
| [32] | Priority | June 26, 1965 |
| [33] | | Switzerland |
| [31] | | 8978/65 |
| | | Continuation of application Ser. No.<br>563,941, June 17, 1966, now abandoned. |

[54] METHOD AND APPARATUS FOR COMPENSATING OF QUENCHING IN LIQUID SCINTILLATION COUNTING
20 Claims, 5 Drawing Figs.

[52] U.S. Cl.......................................................... 250/71.5,
250/83.3, 250/106

[51] Int. Cl............................................................G01n 23/10;
G01t 1/20, G01t 1/36
[50] Field of Search................................................. 250/71.5,
106SC, 83C, 83.3D

[56] References Cited
UNITED STATES PATENTS

| 2,549,402 | 4/1951 | Vossberg, Jr. ................. | 250/83C |
| 3,101,409 | 8/1963 | Fite .............................. | 250/71.5 |
| 3,183,354 | 5/1965 | Amrehn ....................... | 250/71.5 |
| 3,188,468 | 6/1965 | Packard ....................... | 250/106SC |

*Primary Examiner*—Walter Stolwein
*Assistant Examiner*—Morton J. Frome

ABSTRACT: A method and apparatus for automatically counting the activity induced in a test sample containing a radioactive isotope while compensating for the amount of quenching in said test sample by adjusting the photomultiplier excitation or the gain of the amplifier in the detection system.

INVENTOR
PIERRE JORDAN

INVENTOR

PIERRE JORDAN

BY Bacon & Thomas

ATTORNEYS

METHOD AND APPARATUS FOR COMPENSATING OF QUENCHING IN LIQUID SCINTILLATION COUNTING

This application is a continuation of application 563,941 filed Jun. 17, 1966, now abandoned.

The present invention relates to liquid scintillation spectrometry and more particularly to automatic liquid scintillation analysis of samples containing one of more radioactive elements (generally β emitters).

Liquid scintillation methods are becoming widely used, particularly for measuring soft β emitting isotopes in the biological, chemical and medical research fields.

An account of the present state of the art in scintillation counting may be found in several publications, for instance in "Liquid scintillation counting (1957—1963)" by E. Rapkin, in pages 69—87 of the "International Journal of Applied Radiation and Isotopes" (1964).

The principal problem faced in scintillation counting is the determination of counting efficiency of each individual sample (usually having soft β activity) being measured. In contrast to other methods of radioactivity measurement in which a single efficiency factor may be determined by counting a known standard and then applied to all seemingly identical samples to correct for effects of geometry, lack of detector sensitivity, etc., in liquid scintillation counting detection efficiency varies as a result of conditions within the sample itself and counting a standard sample to determine such efficiency is of no value. Among the factors which tend to degrade liquid scintillation counting efficiency are (i) the presence of colored material within the sample which interferes with light transmission and (ii) the presence of colorless materials, which may inhibit the scintillation process. The corresponding inhibitions of performance are termed "color quenching" and "chemical quenching."

Several methods have been evolved for determination of quenching. Among them, the "channels ratio" method is presently used in commercial types of liquid scintillation spectrometers.

Broadly defined, the "channels ratio" method makes use of the fact that as quenching occurs the spectrum of the isotope under investigation, as detected by a photomultiplier, is altered. If a counter using two distinct and separate counting channels A and B is used with an unquenched sample the ratio of channel A/channel B counts will be different than that observed for the quenched sample. By counting a series of samples, each prepared with the same known amount of activity, but with differing quantities of a quenching agent such as carbon tetrachloride, acetone, or pyridine, it is possible to construct a quench calibration curve. Then with such as a curve it is possible to determine the counting efficiency of samples of the said isotope by examining the ratio A/B provided the samples were counted with the same instrument setting used to construct the calibration curve. Modern instrumentation includes provision for automatic mechanical or electronic computation of the desired information.

The "channels ratio" method has a series of advantages. It is nondestructive of sample; each sample need be counted but once; the sample does not move during standardization (which of course takes place while the sample is being counted).

However, the "channels ratio" method does have one serious limitation when used for low activity samples. Counting statistics in the channel with the fewer counts are apt to be poor and will become worse with increased quenching. Therefore, it may be necessary to count each sample for an excessive time period to collect adequate statistics in the channel which is not really of interest.

The amount of quenching may also be determined by the "external standard" method which is also broadly used and was described by Kaufmann as early as during 1959. In this method the sample is counted in normal fashion. At the conclusion of this initial count accumulated data is recorded and then the external standard—a point source containing a relatively high level of γ activity—is transferred from a shielded location to a location in operational relationship with the sample. The sample is then reexamined for a short period; the added counts induced within the sample by the external source are a measure of the quality of the sample and are related to the counting efficiency of the sample.

The "external standard" method has many attractions. It is nondestructive and since the same source is used and reused it is inexpensive; there are no problems of sample manipulation and the second count may be short since the activity level of the source is high.

However it presents drawbacks and limitations too: quenching is evaluated and then taken into account for computing actual activity; accuracy is lowered since two measures are necessary.

It is a main object of the invention to provide automatic compensation of the instability factors (such as solution quenching, spectrometer drift, etc.). It is another object of the invention to provide an improved method and apparatus for automatically restoring the observed count rate for a sample to a value close to that which the sample would have exhibited had there been no quenching.

It is an important object of the invention to provide a method and apparatus for automatically counting the activity induced in a test sample containing a radioactive isotope (generally a β emitter, such as C-14 or H-3) in presence of an auxiliary standard radioactive source and modifying one or more operating parameters of the apparatus as a function of said counting.

It is still an important object of the invention to provide warning to the operator when the amount of quenching in a sample is of such value that no sufficient compensation may be made.

Other objects and advantages of the invention will become apparent from the following description, which refers to the accompanying drawings, wherein.

Figure 5:
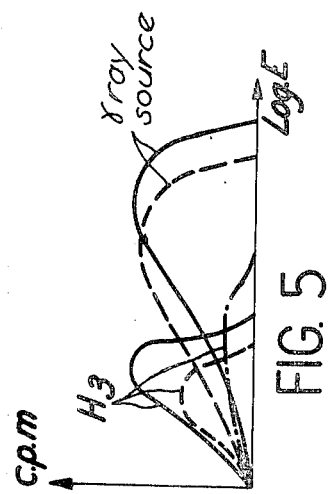
Figure 3:
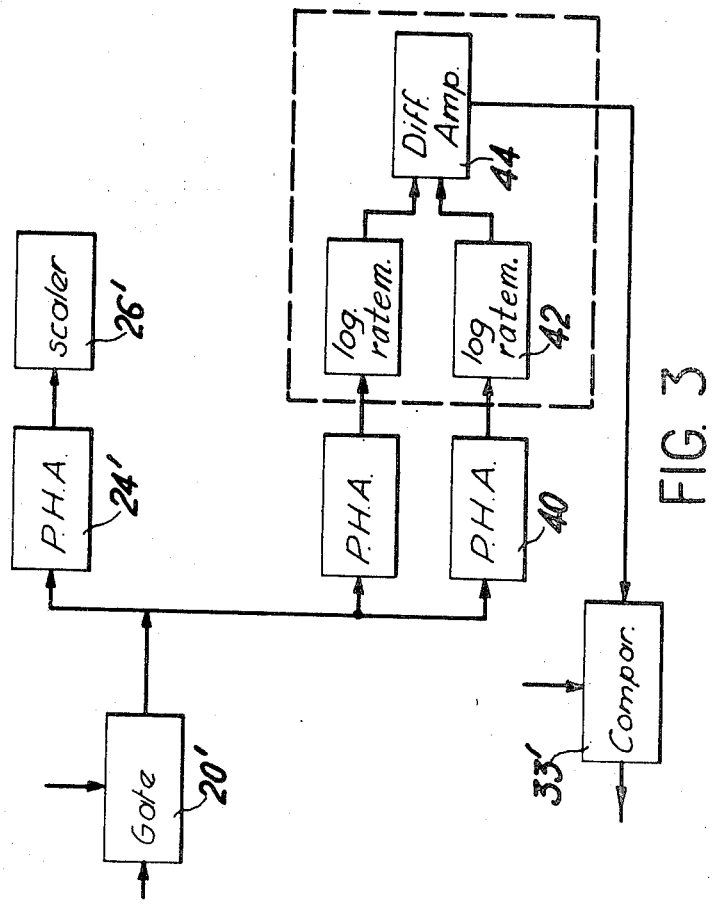
FIG. 3 is a partial block diagram illustrating a modified embodiment of that portion of FIG. 1 which is enclosed in a frame in dot-dash line.

FIG. 5, similar to FIG. 3, illustrates typical pulse height spectra induced by a γ source in a test sample and in a standard scintillator solution and of a weak β emitter, such as H-3, under such operating conditions that compensation of quenching in the sample is not possible.

For a better understanding of the invention, the basic principles thereof will first be outlined in terms of process. Each test sample is counted in presence of an auxiliary radiation source with a system whose operating parameters are set at their normal valves. The added counts provided by the auxiliary source—which is preferably so selected as to provide a pulse height spectrum above that of the radioactive emitter contained in the sample—are counted. If the sample is quenched the added count rate is less than it would be for an unquenched sample. One of the system operating parameters (high voltage or even amplification gain) is automatically altered to increase the added count rate and restore it to the unquenched value. It was experimentally found that the count rate of each radioactive emitter within the sample is similarly increased and approximates the value that it would have exhibited with the normal values of the parameters had the sample not been quenched, at least over a limited range of quenching. For maximum accuracy, a first order correction by altering one parameter (high voltage) and a second order correction, involving only minor changes of another parameter (amplification) may be simultaneously used.

For more clarity, the above explanation has been simplified and advanced embodiments of the invention do not exactly correspond to it, as will be seen later.

The auxiliary radioactive source may be immersed in the solution of scintillator during counting thereof or located in close relationship to the container in a location exactly defined. The counting efficiency corresponding to the source depends upon the same parameters as the efficiency for the sample solution. The radiation of the auxiliary source and the conditions under which it is counted are preferably, although not necessarily, so selected that all parameters which modify the counting efficiency of the sample modify also the efficiency of the auxiliary source by a factor substantially higher (at least twice).

For instance if it appears that the pulse rate for a given sample is reduced by 1 percent due to the addition of a quenching compound under normal operating conditions of the counting device (high voltage of the photomultiplier, amplification gain of the amplifier) for the counting of the sample emitter, the corresponding decrease of the counting rate for the auxiliary source should be at least 2 percent. This purpose may be attained by selecting an auxiliary source which exhibits a sharp pulse height spectrum and by counting with a narrow discrimination window in a spectrum range where the curve of counting rate vs. pulse height has a steep slope. The energy range in which the auxiliary source is counted should be above the counting range for the sample, so that radiation from the sample emitter has no perturbating effect.

Two different cases may be considered relating to the counting rate for the sample.

A. The linear specific ionizing effects of the sample and auxiliary source are substantially identical, as for instance with a $\beta$-labeled sample and "Compton" electrons originating from the sample in relation with a $\gamma$ auxiliary source (Cs 137 for instance). In that instance, the counting rates for the sample and for the auxiliary source are simultaneously brought back to their normal values.

B. The specific linear ionizing effects are different, as for instance with a $\beta$ emitter labeled sample and an $\alpha$ auxiliary source, In that case, the change $\Delta A\beta$ of the amplification necessary for correcting the $\beta$ counting rate and the change $\Delta A\alpha$ which results in correction of the $\alpha$ counting rate are connected by a relation which is valid in a fairly broad energy range:

$$\text{Log } \Delta A\beta = K \text{ Log } \Delta A\alpha$$

in which $K$ is a constant which is dependent neither on the quenching rate, nor on the photomultiplier high voltage. Since the amplification is an exponential function of the latter parameter the high voltages changes $\Delta v\beta$ and $\Delta v\alpha$ necessary for bringing back the $\beta$ and $\alpha$ counting rates, respectively, to their correct values, are related by:

$$\Delta v\beta = c \, \Delta v\alpha$$

where $c$ is another constant coefficient which may be experimentally determined.

As a result, compensation for the $\beta$ emitter is substantially attained as follows: The high voltage difference $\Delta v\alpha$ corresponding to correction of $\alpha$ counting is determined as indicated under A above. The high voltage is then automatically increased by an amount equal to $c \, \Delta v\alpha$ *and the sample is counted.*

If there is no significant overlap between the pulse height spectrum representative of the auxiliary standard source and of the $\beta$ emitter of the sample (as this is the case if an $\alpha$ emitting source is used), the source may be maintained in operative condition while the sample is being counted. One of the channels of the pulse spectrometer may then be used for permanent counting of the auxiliary standard source and controlling of the photomultiplier high voltage.

If on the contrary there is a significant overlap, as occurs with a $\gamma$ ray emitting source, the "normal" counting rate induced in a standard scintillator solution by the auxiliary source is determined once for all and the difference between the "normal" counting rate and the actual counting rate, represented by a voltage signal provided by a pulse height analyzer, is used as an error signal for actuating a control circuit which adjusts the high voltage of the photomultiplier and brings back the voltage signal to a zero value. If the pulse height spectrum of the standard source exhibits an abrupt peak, the upper and lower limits of the pulse height analyzer "window" may preferably be selected to encompass the peak.

The method described above generally provides adequate compensation if the amplitude range in which counting is made and the maximum amount of quenching remain within the limits currently used in liquid scintillation counting. For maximum accuracy however, second order compensation may be provided as will be seen later.

Most auxiliary standard sources having a pulse energy spectrum which fulfills the above conditions are suitable, inter alia:
1. $\beta-$ and $\beta+$ emitters;
2. $\gamma$-ray emitters with or without conversion electrons;
3. $\alpha$ emitters;
4. Neutron emitters, used with a scintillator solution containing a neutron absorption element too.

The shape and position given to the auxiliary standard source should obviously depend upon the type of emitted radiation. The $\gamma$-ray emitting sources may be located out of the vials containing the samples and in close proximity thereto for counting, due to the high energy of $\gamma$-rays Since the Compton spectrum extends up to very low energies, such sources are to be located far from the sample or separated therefrom by a shield during counting of the sample emitter.

When low energy sources, such as $\alpha$ sources, are used, one must make sure that the radiation from the source attains the scintillator solution and sample with an intensity which is sufficiently high and reproducible. In most cases such a source should be immersed in the solution and in the sample or located above the free level and in close proximity thereof. In the latter case, all sample vials should be filled to the same level or the position of the source holder should be modified as a function of the free level in each vial, at least if the amount of quenching is determined by a counting of the scintillations induced in the sample by the standard source. That condition may however be dispensed with if the "channel ratio" method is used, as will be seen later, although complete compensation of color quenching requires that the source be positioned as accurately as possible.

Figure 1:
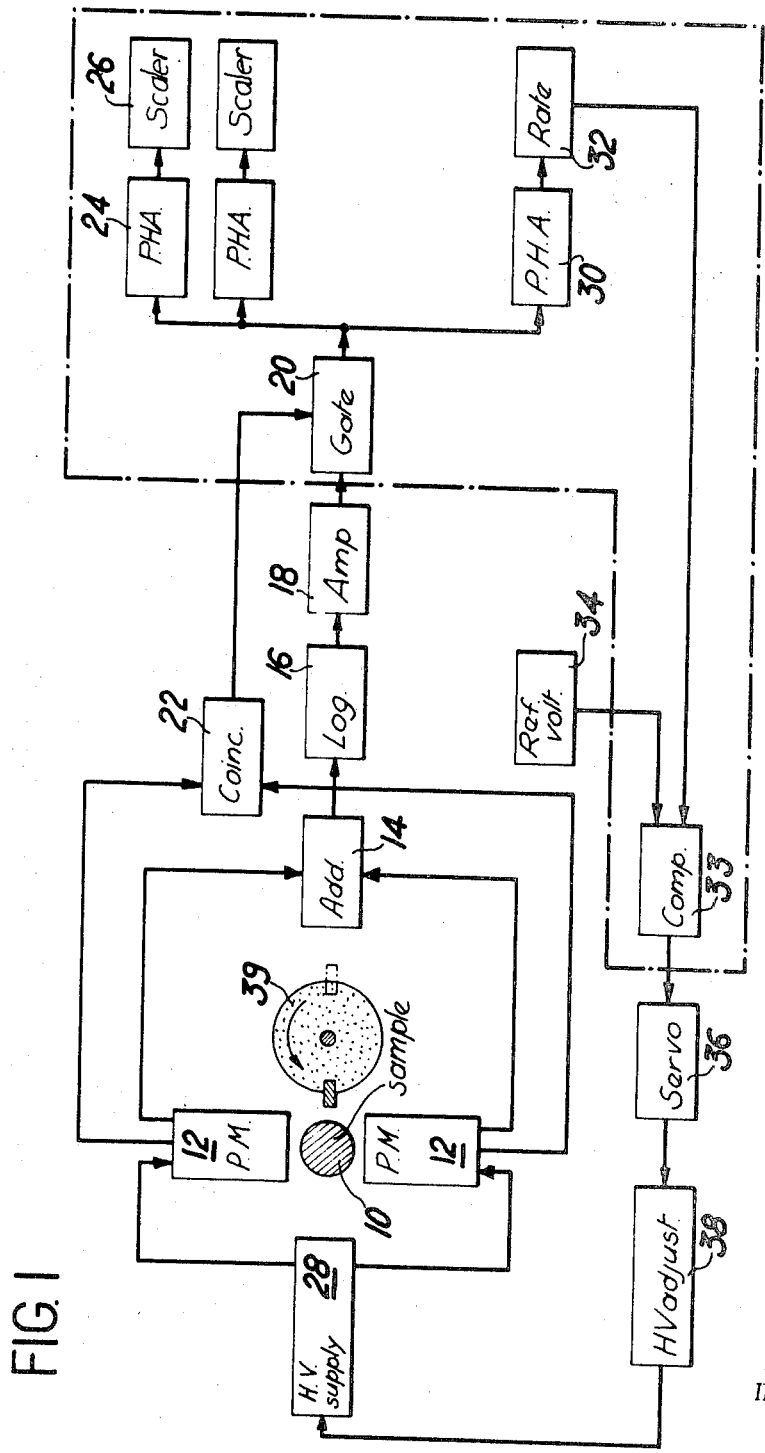
FIG. 1 is a block diagram of a liquid scintillation spectrometer embodying the invention.

Referring now to FIG. 1, there is shown the block diagram of a coincidence-type liquid scintillation spectrometer. All mechanical parts of the apparatus may be identical to those of spectrometers now in current use, such as ANSITRON 1100-1, automatic monitoring and control system for positioning the auxiliary source and the test samples in seriatim order may also be closely related to those used in spectrometers providing "external standard" evaluation of the amount of quenching.

Referring again to FIG. 1, there is shown two photomultipliers 12 on either side of a detection location 10 to and from which test samples may be automatically moved by a conventional system (not shown) in seriatim order. The photomultipliers 12 and station 10 are in a shielded containment chamber (not shown) which protects them against radiation from the outside. The voltage pulses from both photomultipliers are fed to a summation circuit 14, a logarithmic amplifier 16 and a linear amplifier 18. The output of amplifier 18 is connected to a linear gate 20 and a coincidence circuit 22 opens the gate 20 if pulses are simultaneously emitted by both phtotmultipliers. The amplified pulses from the linear gate 20 are passed to several analyzing counting channels in parallel relation. Each channel comprises a pulse height analyzer 24 and a scaler, ratemeter or other suitable counting and recording unit) 26. The number of such analyzing channels is of course course optional and may be proportioned to the number of radioactive isotopes to be counted in the test sample.

According to the invention, a supplemental channel is provided for automatic determination of the amount of quenching and automatic determination of the amount of quenching and automatic adjustment of the high voltage 28. The supplemental channel comprises a pulse height analyzer 30 and a logarithmic ratemeter 32 whose output voltage is compared in comparator 33 with an adjustable reference DC voltage provided by a generator 34. The output signal from the comparator actuates a servomotor 36 which rotates an adjusting potentiometer 38 until the output voltage has been brought back to zero value.

Operation of the system is apparent from the above and will be only briefly described in that case where a γ source is used as auxiliary standard source. It will be supposed that a plurality of test samples, each consisting in a vial containing a scintillator and an amount of radioactive element to be determined in a solvent, should be measured. The following procedure will be used:

1. A standard solution (generally a pure solution) of the scintillator used in the sample is automatically moved to location 10. The γ source carried by a rotatable radiation absorbent disc 39 is moved to a predetermined position (in full lines on FIG. 1) where it induces scintillation into the solution. The output signal of ratemeter 32 is recorded or displayed and is used for manual adjustment of the DC voltage generator 34 and the standard solution is removed.
2. For each sample, the following sequence will then be followed:
    a. The sample is moved to the counting location and subjected to the action of the γ source.
    b. The count rate induced in the test sample is counted. The comparator 33 provides a correction signal which automatically increases the high voltage value up to a point where the count rate is restored to the recorded value.
    c. The "servo" loop is disconnected from potentiometer 38 in order to avoid further modification of H.V. value.
    d. The standard γ source is then brought back to the inoperative position (shown in dotted line of FIG. 1), and
    e. the test sample is counted and the activity is printed.
    f. The test sample is unloaded so that the steps (a to e) may be repeated with the next sample.

Obviously conventional means may be used for automatic feed and removal of the samples and source and such means may be quite similar to those currently used in present day liquid scintillation spectrometers using external standardization, such as ANSITRON 1100-1. The greater part of the electronic circuitry, but that associated with H.V. automatic adjustment, is similar to that used in such spectrometers.

The main advantage of the embodiment described with reference to FIG. 1 consists in that a single channel is sufficient for monitoring, the "window" of that channel being located above the spectrum of that isotope of the sample (among those to be counted) whose radiation is the most energetic. In counterpart, it has an attendant shortcoming: the count induced by the source depends to a slight extend on the sample volume and on the relative position of the source and sample. The amplitude of the corresponding errors may be minimized by selecting a proper source location. If however maximum accuracy is to be obtained, the embodiment of FIG. 3 may preferably be used.

Figure 2:
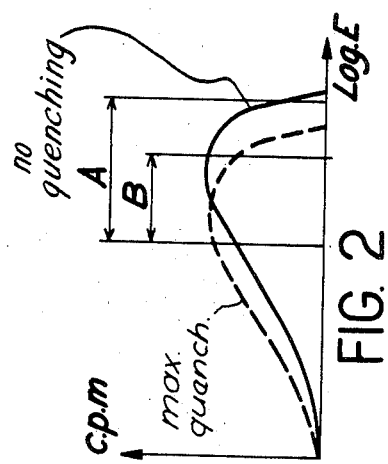
FIG. 2 is a graphic representation of the spectrum of a β emitter in an unquenched solution (curve in full line) and in a quenched solution (dot curve)

For a clearer understanding of the operation of the embodiment of FIG. 3, it should be remembered that quenching results in a shift of the pulse height spectrum to the left as is apparent from FIG. 2. In FIG. 2 there is shown an exemplary spectrum (in full line) in nonquenched conditions and a modified spectrum (in dotted line) representative of quenched condition. A full description of this phenomenon and of the "channel ratio" method for evaluating the amount of quenching may be found in a paper by L.A. Baillie in "International Journal of Applied Radiation and Isotopes" 8.1 (1960). It was experimentally found that variations in the sample volume and in source location with respect to the sample do not appreciably alter the shape of the spectrum induced by the source, while of course they modify the amplitude of the spectrum. As a result the ratio between the counting rates in two channels A and B of the spectrum are substantially unaltered by errors in locating the source since that ratio reflects the shape of the spectrum. One condition should however be fulfilled: the energy ranges selected by channels A and B should be properly located. No critical condition is however imposed and channels A and B may be separate or partially overlapping.

Upon an appropriate selection of the respective location and energy range of channels A and B it is also possible to achieve overcompensation (resulting in a counting rate which is slightly in excess of that without quenching) or undercompensation.

For more clarity, those components of the embodiment of FIG. 3 which have counterparts in FIG. 1 will be designated by the same reference numerals, with a prime mark affixed thereto. In FIG. 3, two analyzing channels, each comprising a pulse height analyzer 40 and a ratemeter 42, are provided and have energy "windows" corresponding to channels A and B of FIG. 2. The two analyzing channels may be similar to those used for "channel ratio" determination of quenching in now conventional units such as the "Beckman" liquid scintillation spectrometer. The signals from channels A and B are fed to a differential amplifier 44 whose output voltage is passed to a comparator 33'. The remaining of the circuitry is substantially identical to that of FIG. 1.

Figure 4:
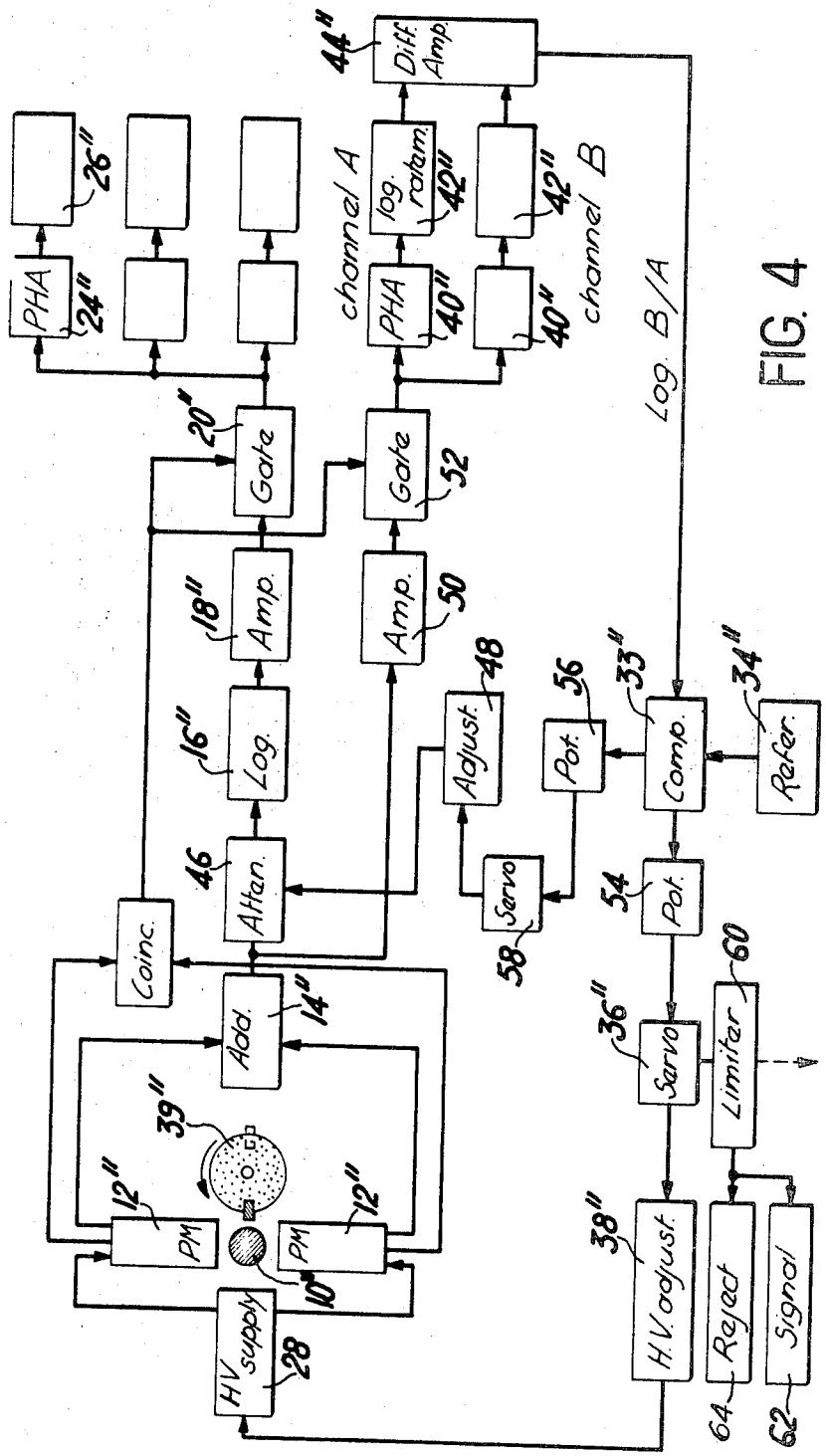
FIG. 4 is a block diagram illustrating another modified embodiment in which two separate circuits are provided for first and second order compensations.

Of course, compensation may be all the more complete if the energy range in which counting is made is narrower. The embodiments of FIG. 1 and FIG. 3 generally provide satisfactory results when the energy range is that currently used for liquid scintillation counting. However, it may be of interest in some cases to count in a quite broad energy range, particularly for maximum sensitivity and with quenching variable within broad limits. In that case, linear correction of the first order, as obtained with the embodiments of FIGS. 1 and 3, may be insufficient and the embodiment of FIG. 4 is preferable. In the embodiment of FIG. 4, linear compensation (first order compensation) is made as indicated in FIG. 3, while residual compensation (second order compensation) is automatically made by modifying a second operating parameter of the system, for instance the amplification gain.

In the embodiment of FIG. 4, two photomultipliers 12" connected to a common amplification circuit straddle location 10" provided for reception of the samples or standard solution. The circuit is split into two branches from the output of adder circuit 14". The first branch feeds the counting channels for monitoring of the radioisotopes eventually contained in the samples. That first branch comprises a linear attenuator 46 whose attenuation is adjustable by a control potentiometer 48. The final portion of the branch is identical to the corresponding portion of the embodiment shown in FIG. 1 or 3.

The second branch comprises a linear amplifier 50 and a gate 52. It feeds a circuit for determination of the ratio between the pulse rates in two channels A and B, such circuit being quire similar to that shown in FIG. 3. The two logarithmic ratemeters 42" and the differential amplifier 44" may be combined into a single circuit for providing a signal voltage representative of the ratio of the output circuit from the analyzers 40". Obviously the ratemeters may be replaced by scalers for counting the source-induced activities for short periods: in such case the counts are compared to a standard count made in a period of same length.

As in FIG. 3, the output signal from differential amplifier 44"is fed to comparator 33". The comparator actuates a servosystem 36 for controlling the high voltage adjust 38. The servocircuit restores the counting rate induced by the source in each sample to the value obtained with the standard solution. A manually actuated adjusting potentiometer 54 is preferably inserted between comparator 33" and servocircuit 36".

The comparator 33" also feeds a servomotor 58 through a second manually adjustable potentiometer 56. The servomotor 58 actuates the control potentiometer 48, which controls the attenuation of the attenuator 46. The servomotor 58 may for instance consist of a cam whose shape is experimentally determined and is intended to balance the second order deviation between the complete compensation for the γ source and the compensation for the radioisotopes (weak β emitters in most cases) in the sample.

The embodiment of FIG. 4 is obviously more sophisticated than those of FIGS. 1 and 3 and should be used only if extreme accuracy is desired in a broad energy range and with amounts of quenching variable within broad limits.

The pulse height spectrum of the γ-ray source should be located above those of the radioisotopes to be monitored. Since however quenching becomes less and less of a problem with the more energetic isotopes a source (such as Cs-137) which provides a spectrum more energetic than that of C-14 is generally adequate.

In FIG. 4, there is illustrated a warning circuit which may also be used in connection with the embodiments of FIGS. 1 and 3. That circuit is intended to inform the operator when the degree of quenching exceeds the ability of the system at automatic compensation.

An example of such situation is that when quenching is severe and a weak β emitter such as tritium is used, low energy events may not produce sufficient light to cause the photomultipliers to pulse, whatever the H.V. may be. Under those conditions the energetic standard source is likely to produce its spectrum in the samples and increasing system gain or even photomultiplier H.V. might bring that count back to an unquenched value. However the low energy spectrum of tritium cannot be restored if the photomultipliers did not pulse and the count is irrevocably lost.

Occurence of such conditions is illustrated on FIG. 5, which is a graphic representation of typical pulse height spectra characteristics:
  of a beta emitting isotope illustrating an unquenched spectrum, a spectrum that might result because of intense quenching in the liquid scintillation medium and a quenched spectrum after H.V. increase;
  of a γ-ray standard source illustrating an unquenched (and restored) spectrum and the corresponding quenched spectrum.

It is clearly apparent from a comparison of the curves in full line and dash-dot line that a count made in a channel which does encompass the low energy range will not be restored to its correct unquenched value.

The embodiment of FIG. 4 provides to the operator a warning if the ability of the system to compensate quenching is exceeded. If the high voltage increase necessary for restoring the correct counting rate for the γ-ray source exceeds a predetermined value, an indication is given by an indicator 62. In addition, reject means 64 may be provided for automatically rejecting the sample in view of later counting with different operating parameters increasing the sensitivity in the low energy range. The warning threshold may be experimentally determined for each type of radioisotopes in order to provide an index of a substantial probability of noncompensation. In fact, such occurence is limited to tritium counting.

Some indication of the advantages of the invention will be rendered apparent from the following results of two experiments which are given for illustration of use of a γray emitting source and of an α source, respectively; In both cases the following components were used:
  liquid scintillation probe "Nuclear Enterprise" NE 5503
  pulse spectrometer Hammer N 302
  HV power supply Philips PW 4023
  ratemeter Philips PW 4042/01
  time counter Philips PW 4062
  counter Philips PW 4032

The scintillation solution was a conventional toluene solution containing 0.5 percent POP and 0.05 percent POPOP; the temperature was regulated at 13° C. the isotopes were H-3 (labelling stearic acid) and C-14 (labelling benzoic acid). The quenching agents were aceton, ethanol, acetic acid and trichloracetic acid for chemical quenching and azobenzol for color quenching. Quenching compensation was made by increasing the value of the high voltage applied to the photomultiplier tube.

First Example

The auxiliary γ source was a 0.2 milliliter solution containing about 0.1 μCi of Cs 137, in a needle of 2 mm. I.D. and 6 mm. O.D., secured to the plug of the sample vial and immersed into the solution up to 15 mm. from the bottom.

The discrimination "window" was set to select the energy range between 0.315 and 0.350 MeV for γ-ray counting. β counting was made with an integrating circuit having an input sensitivity as low as 0.5 mv. High voltage was adjustable from 700 v. to 1700 v. with a normal value of about 800 v.

The correct value $N\gamma o$ of the pulse rate for the γ-ray source was first determined once for all with a pure scintillator solution involving no quenching. Then each count with compensation of quenching included the following steps:
  1. The H.V. value was automatically adjusted while the pulse rate induced by the γ-ray source in each sample was counted for restoring the count rate to a value equal to $N\gamma o \pm 1$ percent.
  2. The γ-ray source was removed and the activity of the sample was counted with the adjusted H.V. value.

In that case the γpulse rate vs. H.V. has a 1.8 percent per volt slope: for a maximum error of 0.05 percent on C-14 counting and 0.5 percent for H-3 counting, it is sufficient to adjust the high voltage with a ±0.2 volt accuracy.

Second Example

The α source was an electrolytic layer of polonium deposited on a thin gold sheet and protected by a thin gold coating. The source was immersed in the scintillator solution in a reproducible location for counting. The discrimination window was 50 kev. broad and so located that a peak of the α emission of polonium be observed. The 50 kev. energy for α particles corresponds to about 0.5 mev. for β particles since the fluorescence efficiency of α particles (0.7 photon/kev.) is approximately 10 times lower than that of β particles (7 photons/kev.).

During routine counting, the conditions were such as to be depicted by the steep portion of the curve counting rate vs. H.V. on photomultiplier. In that portion the slope $dN\alpha 1 dV$ was notable better than with the γ source and had a value/7 percent per volt.

Adjustment of the high voltage before sample counting consisted in an increase by a factor equal to $c\ \Delta\nu\alpha$, wherein $\Delta\nu\alpha$ had been determined as indicated in the first example. The coefficient $c$ was determined from the relative positions of the curves: pulse rate vs. H.V. for α and β radiations and for different percentages of quenching. The value of $c$ was found to be about 2.

Numerous measures obtained with γ-ray and α sources and with samples exhibiting quenching absorptions up to 20 percent with adjustment of high voltage before each counting, have shown that the effects of the instability factors—and over all the action of chemical and color quenching—was reduced by a factor between 10 and 20 for H-3 as well as for C-14.

It will be appreciated by those skilled in the art that the purposes set out above as well as others have been achieved: no manual manipulation or calculation after counting is required. The invention is adapted to automatic processing of a high number of samples in seriatim order, such samples containing one or several radioisotopes.

Although specific embodiments of the instant invention have been shown with a certain degree of particularity, the invention is susceptible of various modifications and alternative forms and the specific embodiments have been shown by way of example only and it should be understood that it is not intended to limit the invention to the particular forms disclosed, and various changes, modifications, equivalents and alternatives may be made which fall within the spirit and scope of the invention as expressed in the appended claims and will be apparent to those skilled in the art.

I claim:

1. A method for compensation of quenching in liquid scintillator counting of each of a plurality of individual samples comprising the steps of:
   a. exposing a standard solution of scintillator to a standard ionizing radiation emitter;
   b. counting the light scintillations induced in said standard solution by said standard emitter;
   c. replacing said standard solution with each of said samples in seriatim order, altering at least one of high voltage excitation applied to photomultiplier means or gain of amplification means fed by said photomultiplier means of the liquid scintillation operating system by such an amount that the observed count rate for said standard emitter approximates the count rate obtained from said standard solution, removing said standard emitter, and counting said sample.

2. The method according to claim 1, wherein said standard solution exhibits substantially no quenching, whereby the change in said high voltage or gain restores the count rate induced by said standard emitter in said sample to the value it would have exhibited had there been no quenching.

3. A method for compensation of quenching in liquid scintillation counting of individual samples, comprising the steps of counting a standard ionizing radiation emitter placed in operating association with each of said individual samples in seriatim order and altering at least one of high voltage excitation applied to photomultiplier means or gain of amplification means fed by said photomultiplier means of the counting system to adjust the observed count rate induced in the sample to a predetermined constant value prior to counting said individual sample.

4. The method of claim 3, wherein a value representative of the count rate said standard emitter induces in a standard solution is stored, the count rate induced by the standard emitter in the sample is compared to said stored value and said high voltage or gain is automatically modified until the second-named count rate has been brought back to the stored value.

5. The method of claim 3, wherein a value representative of the ratio of the count rates in two energy ranges of the spectrum said standard emitter induces in an unquenched sample is stored, and wherein the ratio of the count rates in said energy ranges of the spectrum induced by said standard emitter in said individual samples is compared to said stored information and said high voltage or gain varied until the second-named ratio has been brought back to a predetermined value.

6. The method of claim 3, comprising alteration of high voltage excitation for first order compensation and of the amplification gain for second order correction.

7. The method of claim 3, wherein the alteration of operating parameters is such as to restore the standard emitter count rate and count rate ratio to the value which it would have exhibited had there been no quenching.

8. The method of claim 3, wherein the alteration of operating parameters is such as to restore the standard emitter count rate to a predetermined percentage of its original value, which percentage is close to 100 percent.

9. The method of claim 8, wherein the percentage of restoration may be automatically varied in response to quenching amount.

10. In a liquid scintillation system for analyzing a plurality of test samples in seriatim order, including photomultiplier means, amplification means and a pulse counting circuit means for automatically increasing high voltage applied to said photomultiplier means or increasing gain of said amplification means in response to a measured difference between the count rate induced in samples by a standard ionizing radiation emitter and the count rate induced by said radiation emitter in a standard scintillator solution, whereby the count rate of said sample is made to approximate the count rate that the sample would have exhibited under predetermined sample quenching conditions.

11. A system according to claim 10, wherein the standard ionizing radiation emitter is a emitter.

12. A system according to claim 10 for H-3 and C-14 liquid scintillation counting, wherein said standard emitter induces within an unquenched liquid scintillation sample a spectrum which is appreciably more energetic than the spectrum of C-14 within that sample.

13. A system according to claim 10, including a generator providing an adjustable DC voltage, a count rate determination ratemeter which provides a DC output and comparator between said voltage and output.

14. A system according to claim 13, wherein said ratemeter is logarithmic.

15. In a liquid scintillation spectrometer for analyzing a plurality of test samples each consisting in a vial containing a solution of a scintillator and of radioactive element:
   shielded obscure chamber;
   stationary photmultiplier means located adjacent said chamber for producing signal pulses in direct relation with the energy of light scintillations in said chamber;
   means for introducing a standard scintillation solution and said samples into said chamber and removing them in seriatim order;
   a standard radiation source adapted to induce in said solution and samples an energy spectrum substantially above that of said radioactive element;
   first means for determining the count rate of said signal pulses induced in said standard solution and samples by said source;
   for storing the count rate induced by said source in said standard solution;
   for automatically altering the photomultiplier high voltage to restore the pulse rate induced by said source on each of said samples in seriatim order to said stored value; and
   second means for counting the pulses from said samples with the respective adjusted high voltages.

16. In a spectrometer according to claim 15, means for moving said source between a position in disoperative association with said solution and samples when located in said chamber, wherein said standard source is a gamma emitter inducing in said solution and samples a pulse height spectrum which overlaps the spectrum from said radioactive element and said first means have a counting energy window above the energy spectrum of said radioactive element.

17. In a liquid scintillation spectrometer for analyzing a plurality of test samples each consisting in a vial containing a solution of a scintillator and of a radioactive element;
   a shielded obscure chamber;
   stationary photomultiplier means located adjacent said chamber for producing signal pulses in direct relation with the energy of light scintillations in said chamber;
   means for introducing a standard scintillation solution and said samples into said chamber and removing them in seriatim order;
   a standard radiation source adapted to induce in said solution and samples an energy spectrum substantially above that of said isotope;
   first means fed by said photomultiplier means for counting the ratio of the signal pulses induced in two energy channels into said standard solution and samples by said source, for storing the pulse ratio induced by said course in said standard solution, and for automatically at altering the photomultiplier high voltage substantially to restore the ratio of pulses of the spectrum induced by said source in each of said samples in seriatim order to said stored value; and
   second means for counting the pulses from said samples with the respective adjusted high voltages.

18. In a liquid scintillation system for analyzing a plurality of test samples in seriatim order, including photomultiplier means, amplification means and a pulse counting circuit, means for automatically increasing high voltage excitation applied to said photomultiplier means or increasing gain of said amplification means in response to a measured difference between count rate ratio induced in samples by a standard ionizing radiation emitter and count rate ratio induced by said standard radiation emitter in a standard scintillator solution, whereby the count rate ratio of said sample is made to approximate the count ratio of said standard scintillator solution.

19. In a liquid scintillation system for analyzing a plurality of test samples in seriatim order, including photomultiplier means, amplification means and a pulse counting circuit, means for automatically increasing high voltage excitation applied to said photomultiplier means or increasing gain of said amplification means in response to a measured difference between count rate ratio induced in samples by a standard ionizing radiation emitter and count rate ratio induced by said standard radiation emitter in a standard scintillator solution, whereby the count rate ratio of said sample is made to approximate the count ratio that the sample would have exhibited under predetermined sample quenching conditions.

20. A system according to claim 19 for H-3 and C-14 liquid scintillation counting, wherein said standard emitter induces within an unquenched liquid scintillation sample a spectrum which is appreciably more energetic than the spectrum of C-14 within that sample.

UNITED STATES PATENT OFFICE
CERTIFICATE OF CORRECTION

Patent No. 3,560,744    Dated February 2, 1971

Inventor(s) Pierre Jordan

It is certified that error appears in the above-identified patent and that said Letters Patent are hereby corrected as shown below:

Column 1, line 7, delete "of" substitute -- or --

Column 4, line 68, before "ratemeter" insert -- ( --

Column 4, lines 74 and 75, delete "automatic determination o the amount of quenching and"

Column 5, line 56, delete "extend" substitute -- extent --

Column 8, line 37, delete "mev" substitute -- Mev --

Column 8, line 37, delete "value/7" substitute -- value of

Claim 11, line 2, before "emitter", second occurrence, inser -- γ --

Claim 17, line 62, after "automatically" delete "at"

Signed and sealed this 21st day of September 1971.

(SEAL)
Attest:

EDWARD M. FLETCHER, JR.
Attesting Officer

ROBERT GOTTSCHALK
Acting Commissioner of Pat